United States Patent
Hernandez et al.

(10) Patent No.: US 11,938,361 B2
(45) Date of Patent: *Mar. 26, 2024

(54) ANTIFREEZE FORMULATIONS AND SPRINKLER SYSTEMS COMPRISING IMPROVED ANTIFREEZES

(71) Applicant: Tyco Fire Products LP, Lansdale, PA (US)

(72) Inventors: Hayden Erik Hernandez, Cranston, RI (US); Jeremy Tyler Cogswell, Johnston, RI (US); Sean E. Cutting, West Warwick, RI (US); Jacob Gelinas, Providence, RI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/088,391

(22) Filed: Dec. 23, 2022

(65) Prior Publication Data

US 2023/0132729 A1 May 4, 2023

Related U.S. Application Data

(63) Continuation of application No. 17/394,582, filed on Aug. 5, 2021, now Pat. No. 11,559,716, which is a
(Continued)

(51) Int. Cl.
*A62D 1/00* (2006.01)
*A62C 3/00* (2006.01)
(Continued)

(52) U.S. Cl.
CPC ............ *A62D 1/0042* (2013.01); *A62C 3/004* (2013.01); *A62C 35/60* (2013.01); *A62D 1/0035* (2013.01); *C09K 5/20* (2013.01); *A62C 35/64* (2013.01)

(58) Field of Classification Search
CPC ....................................................... C09K 5/20
See application file for complete search history.

(56) References Cited

U.S. PATENT DOCUMENTS

| | | |
|---|---|---|
| 2,233,185 A | 2/1941 | Smith |
| 3,422,011 A | 1/1969 | Jackovitz et al. |

(Continued)

FOREIGN PATENT DOCUMENTS

| | | |
|---|---|---|
| JP | 2003-135620 A | 5/2003 |
| WO | WO-2012/045080 A1 | 4/2012 |
| WO | WO-2017/161162 A1 | 9/2017 |

OTHER PUBLICATIONS

"Development of an Improved Agricultural-Based Deicing Product," National Concrete Pavement Technology Center, Iowa Highway Research Board, Final Report, Jan. 2010 (108 pages).
(Continued)

*Primary Examiner* — Peter F Godenschwager
(74) *Attorney, Agent, or Firm* — Foley & Lardner LLP (57) ABSTRACT

Antifreezes are provided for deployment in wet sprinkler systems located in cold environments. The antifreezes allow for the wet sprinkler system to be actuated under temperatures below 32° F. Wet sprinklers, sprinkler systems, methods of providing for the control, suppression and/or extinguishment of a fire that occur in a cold environment, and methods of preventing wet sprinklers from freezing also are provided. The sprinklers, sprinkler systems and methods can be used in residential, commercial and storage settings.

14 Claims, 3 Drawing Sheets

Related U.S. Application Data continuation of application No. 15/993,004, filed on May 30, 2018, now Pat. No. 11,110,311, which is a continuation-in-part of application No. 15/842,282, filed on Dec. 14, 2017, now Pat. No. 10,046,191.

(60) Provisional application No. 62/598,805, filed on Dec. 14, 2017, provisional application No. 62/598,851, filed on Dec. 14, 2017, provisional application No. 62/513,043, filed on May 31, 2017, provisional application No. 62/513,078, filed on May 31, 2017, provisional application No. 62/513,000, filed on May 31, 2017.

(51) Int. Cl.
*A62C 35/60* (2006.01)
*A62C 35/64* (2006.01)
*C09K 5/20* (2006.01)

(56) References Cited

U.S. PATENT DOCUMENTS

| | | | |
|---|---|---|---|
| 3,457,172 | A | 7/1969 | Stewart et al. |
| 3,579,446 | A | 5/1971 | Kroke et al. |
| 3,609,074 | A | 9/1971 | Rainaldi et al. |
| 3,957,657 | A | 5/1976 | Chiesa, Jr. |
| 4,060,132 | A | 11/1977 | Chiesa, Jr. |
| 4,060,489 | A | 11/1977 | Chiesa, Jr. |
| 4,306,979 | A | 12/1981 | Tsuji |
| 4,387,032 | A | 6/1983 | Chiesa, Jr. |
| 4,420,434 | A | 12/1983 | Falk |
| 4,424,133 | A | 1/1984 | Mulligan |
| 4,464,267 | A | 8/1984 | Chiesa et al. |
| 4,536,298 | A | 8/1985 | Kamei et al. |
| 5,207,932 | A | 5/1993 | Norman et al. |
| 5,218,021 | A | 6/1993 | Clark et al. |
| 5,496,475 | A | 3/1996 | Jho et al. |
| 5,616,273 | A | 4/1997 | Clark et al. |
| 5,651,416 | A | 7/1997 | Clauson et al. |
| 5,750,043 | A | 5/1998 | Clark |
| 5,820,776 | A | 10/1998 | Hansen et al. |
| 6,156,222 | A | 12/2000 | Jennings et al. |
| 6,231,778 | B1 | 5/2001 | Hansen |
| 6,599,872 | B1 | 7/2003 | Hubert et al. |
| 6,845,823 | B2 | 1/2005 | Shiga |
| 7,005,082 | B2 | 2/2006 | Clark |
| 7,388,041 | B2 | 6/2008 | Cegelski et al. |
| 7,559,376 | B2 | 7/2009 | Silva, Jr. |
| 7,569,155 | B2 | 8/2009 | Schaefer |
| 7,744,686 | B2 | 6/2010 | Tochigi et al. |
| 8,182,714 | B2 | 5/2012 | Ossian |
| 8,298,436 | B2 | 10/2012 | Michael |
| 8,524,104 | B1 | 9/2013 | Michael |
| 8,772,370 | B1 | 7/2014 | Sulemanji |
| 8,946,486 | B2 | 2/2015 | Martin |
| 8,969,260 | B2 | 3/2015 | Pomerleau |
| 9,669,246 | B2 | 6/2017 | Bowen et al. |
| 9,950,978 | B2 | 4/2018 | Martin |
| 9,956,447 | B2 | 5/2018 | Martin et al. |
| 9,956,448 | B2 | 5/2018 | Martin |
| 10,046,191 | B1 | 8/2018 | Hernandez et al. |
| 10,173,089 | B2 | 1/2019 | Xie |
| 11,110,311 | B2 * | 9/2021 | Hernandez ............ A62C 35/60 |
| 11,559,716 | B2 * | 1/2023 | Hernandez ............ A62C 35/60 |
| 2003/0201419 | A1 | 10/2003 | Tanaka et al. |
| 2007/0251707 | A1 | 11/2007 | Hagar et al. |
| 2008/0185553 | A1 | 8/2008 | Ziemer et al. |
| 2008/0196908 | A1 | 8/2008 | Schaefer |
| 2011/0006250 | A1 * | 1/2011 | Lievens ............... C23F 11/08 |
| | | | 252/75 |
| 2011/0240309 | A1 | 10/2011 | Kingma et al. |
| 2014/0138105 | A1 | 5/2014 | Kuwatch et al. |
| 2016/0023032 | A1 | 1/2016 | Bowen |
| 2016/0030790 | A1 | 2/2016 | Libal et al. |
| 2016/0030793 | A1 | 2/2016 | Xie |
| 2016/0038778 | A1 | 2/2016 | Siem |
| 2016/0038779 | A1 | 2/2016 | Bowen et al. |
| 2016/0102233 | A1 | 4/2016 | Chen et al. |
| 2017/0056698 | A1 | 3/2017 | Pai et al. |
| 2017/0161156 | A1 | 6/2017 | Blea et al. |
| 2017/0161162 | A1 | 6/2017 | Blea et al. |
| 2017/0182341 | A1 | 6/2017 | Libal |
| 2017/0203136 | A1 | 7/2017 | Blizzard et al. |
| 2018/0345061 | A1 | 12/2018 | Hernandez et al. |

OTHER PUBLICATIONS

Antifreeze Solutions in Home Fire Sprinkler Systems, The Fire Protection Research Foundation, Copyright Jun. 2010 (49 pages).
Arvidson, "Flammability of antifreeze agents for automatic sprinkler systems," Journal of Fire Protection Engineering, 2011, vol. 21, No. 2 (pp. 115-132).
Connor, "Dispelling the Myths of Heat Transfer Fluids," The Dow Chemical Company, Metadata Feb. 8, 2012 (31 pages).
Fire & Ice Master GL48, Glycerine-Based Non-Toxic Freeze Protection Fluid, Metadata Jul. 22, 2016 (2 pages).
Heinonen et al., Anti-Freeze Fluid Environmental and Health Evaluation—An Update (no earlier than 1998) (11 pages).
Noble Comapny: FireFighter PG38 Pre-mixed Antifreeze for Wet Fire Sprinkler Systems, Copyright 2014 (2 pages).
Noble Company: FireFighter Antifreeze, Freeze protection fluids for wet fire sprinkler systems, Oct. 2017 (2 pages).
Noble Company: FireFighter Eliminator F Fire Protection Fluids, Copyright 2013 (1 page).
Noble Company: FireFighter GL48 Pre-mixed Antifreeze for Wet Fire Sprinkler Systems, 2014 (2 pages).
Noble Company: FireFighter PG30 Pre-mixed Antifreeze for Wet Fire Sprinkler Systems, Copyright 2014 (2 pages).
Standard Test Method for Freezing Point of Aqueous Engine Coolants, Designation: D1177-05, ASTM International, 2005 (3 pages).
Temper S antifreeze—Temper Technology http://www.temper.se/temper-s/ ; downloaded Dec. 11, 2017 (3 pages).
Temper Technolgy: Fire protection in Cold & freeze storages, Copyright 2016 (5 pages).
UL: UL1626 Standard for Safety for Residential Sprinklers for Fire Protection Service, Apr. 12, 2012 (and other dates)(85 pages).
UL: UL2901 Outline Investigation for Antifreeze Solutions for Use in Fire Sprinkler Systems, Issue No. 1, Dec. 19, 2013 (18 pages).

\* cited by examiner

ANTIFREEZE FORMULATIONS AND SPRINKLER SYSTEMS COMPRISING IMPROVED ANTIFREEZES

CROSS-REFERENCE TO RELATED APPLICATIONS

This application is a continuation of U.S. patent application Ser. No. 17/394,582, filed Aug. 5, 2021, which is a continuation of U.S. patent application Ser. No. 15/993,004, filed May 30, 2018 and now U.S. Pat. No. 11,110,311, which is a continuation-in-part of U.S. patent application Ser. No. 15/842,282, filed Dec. 14, 2017 and now U.S. Pat. No. 10,046,191, which in turn claims priority to U.S. Provisional Patent Application Nos. 62/513,043, filed May 31, 2017, and 62/513,078, filed May 31, 2017, all of which are hereby incorporated by reference in their entireties. U.S. patent application Ser. No. 15/993,004 also claims the benefit of priority to U.S. Provisional Application Nos. 62/598,805, filed Dec. 14, 2017; 62/598,851, filed Dec. 14, 2017; 62/513,000, filed May 31, 2017; 62/513,043, filed May 31, 2017; and 62/513,078, filed May 31, 2017, all of which are hereby incorporated by reference in their entireties.

TECHNICAL FIELD

The present invention relates generally to antifreeze formulations (liquid freeze protectants) for deployment in fire protection sprinklers and sprinkler systems. Methods of preventing freezing and methods of suppressing, controlling, and/or extinguishing fires, as well as fire protection sprinklers and systems, also are provided.

BACKGROUND

Fire protection sprinklers often need to be located in cold environments where the temperature is subject to falling below the freezing point of water (32° F., 0° (at sea level), referred to herein as a freezing temperature. Such cold environments are found in commercial, storage and residential settings, such as open areas, freezers, cold rooms, passageways, garages, sheds, or other areas exposed to freezing temperatures, for example, unheated buildings in freezing climates or cold-storage rooms. If a conventional sprinkler system is located in a cold environment, the water will freeze in the sprinkler head and/or pipe and render the sprinkler unable to actuate or damage the sprinkler and/or piping.

Conventional sprinkler systems are fully filled (charged) with liquids (for example, water) and are referred to as "wet sprinkler systems." As is known in the art, these systems include sprinkler heads and piping.

One approach for dealing with cold environments is referred to as a "dry sprinkler system." Dry sprinkler systems are designed such that in the unactuated state, the water is kept out of the portion of the system that is located in the cold environment. Only upon activation does the water enter the portion of the system that is located in the cold environment. Dry sprinklers and systems are disclosed in, for example, U.S. Pat. No. 7,559,376, and also include sprinkler heads and piping.

Wet sprinklers, on the other hand, are designed to be filled with a liquid when in the unactuated state. For wet sprinklers that are not placed in cold environments, the sprinkler can be filled with water.

Another approach for cold environments is the deployment in wet sprinkler systems of liquids having freezing points below the freezing point of water, and often are referred to as "antifreezes" or "liquid freeze protectants." Early industrial antifreezes included the use of alcohols, such as methanol. Methanol, however, is flammable, toxic, and tends to be corrosive. Ethylene glycol and propylene glycol have supplanted methanol as an antifreeze.

The National Fire Protection Association (NFPA) has permitted antifreeze in sprinkler systems since at least as early as 1952. Arvidson, *J. Fire Protect. Eng.* 21(2):115-32 (2011) The NFPA currently permits a maximum of 38% by volume propylene glycol and a maximum of 48% by volume glycerin (glycerol) for fire sprinklers, and 48% vol. glycerin and water antifreezes are currently on the market. However, these two water additives, at their highest allowable concentrations have freezing points of 0° F. (propylene glycol) and −15° F. (glycerin). The field, however, has experienced various difficulties with these chemical components. First, propylene glycol cannot be used in systems having chlorinated polyvinyl chloride (CPVC) pipes. Moreover, these two components, at their highest allowable concentrations, have the potential of adding heat to a fire, which is measured as the "heat release rate."

As reported by Arvidson, antifreezes have resulted in flashovers upon sprinkler activation. In a tragic incident in Truckee, California, an explosion occurred with a residential sprinkler system containing an antifreeze, which resulted in a fatality and another victim badly burned.

U S. Patent Application Publication 2014/0138105 A1 discloses the use of carboxylate salts in propylene glycol and glycerol-containing fluids. This publication discloses glycerol concentrations up to 60% wt., the use of 5% wt. to 50% wt. of a carboxylate salt, like potassium formate, and a reserve of alkalinity to ensure that pH does not drop below 8.

It is therefore desirable to develop antifreezes that have lower concentrations of glycerol (glycerin) and salts, and yet have a lower freezing point while avoiding flashovers and adding less heat to fires. It is also desirable to avoid the use of ethylene and propylene glycol.

Glycerol (glycerin) has a molecular formula of $C_3H_8O_3$ and an IUPAC name of propane-1,2,3-triol. The structure is depicted below:

SUMMARY

Preferred embodiments provide antifreezes to be deployed (used) in wet sprinklers systems, and such sprinkler systems containing antifreezes for use in cold environments, such as freezers, cold rooms and locations exposed to the elements. Additionally, the antifreezes can be deployed in wet and dry sprinkler systems where there may be a risk of freezing temperatures in parts of the system that would normally be filled with water. Such a risk would include loss of heating in a warehouse or other structure, for example.

The antifreezes preferably comprise water ($H_2O$) having a conductivity of no more than 500 µS/cm² at room temperature (although higher conductivity levels are permitted); glycerol; and salts of an organic acids having one of more carboxylic acid groups, wherein glycerol is present in a volume percentage of 35% to 48% and the salt(s) are present in a weight percentage of 0.01% to about 1%, although percentages can be higher, up to and including 2%. Preferably, the antifreeze has a heat release rate of no more than 10% higher than the heat release rate of at least one fire condition selected from the group of conditions consisting of just prior to discharge of the antifreeze solution for any consecutive 15 second period throughout the discharge of the antifreeze. A possible criteria also can rely upon a the maximum running 60 second average heat release rate measured prior to discharge of the antifreeze solution for any consecutive 15 second period throughout the discharge of the antifreeze. Alternatively, higher or different heat release rates (e.g., less than 25% higher, less than 20% higher, less than 15% higher, or less than 12% higher, etc.) may be permitted if allowed under current or future standards or guidelines. The heat release rate can be determined using pendent sprinklers having a nominal K-factor of 4.2 and 8.0 gpm/(psig)$^{1/2}$ on a supply piping arrangement comprising nominal 2-inch diameter steel pipe or larger connected to a pump system capable of providing the required test pressure and flow. Moreover, the heat release rate can be determined using a line-burner assembly with four spray nozzles arranged to discharge heptane at a total flow rate of 1.6 gpm (6.0 l/min) resulting in a fire having a nominal total heat release rate of 1,400 to 3,000 kW. The spray nozzles can be to be spaced 24 inches (610 mm) apart on the supply line and 24 inches (610 mm) above the floor.

Preferably, the organic acids are at least one selected from the group consisting of formic acid (methanoic acid), acetic acid (ethanoic acid), propionic acid, butyric acid (butanoic acid), valeric acid (pentanoic acid), caproic acid (hexanoic acid), lactic acid (2-hydroxypropanoic acid), malic acid (2-hydroxybutanedioic acid), citric acid (2-hydroxypropane-1,2,3-tricarboxylic acid), benzoic acid (benzenecarboxylic acid), oxalic acid (ethanedioic acid), malonic acid (propanedioic acid), succinic acid (butanedioic acid), glutaric acid (pentanedioic acid), adipic acid (hexanedioic acid), pimelic acid (heptanedioic acid), suberic acid (octanedioic acid), azelaic acid (nonanedioic acid), sebacic acid (decanedioic acid). The salts preferably are potassium salts or sodium salts. Preferred salts are potassium acetate, potassium formate and potassium succinate.

The antifreezes can further comprise at least one buffer, such as one or more selected from the group consisting of citrate buffers, carbonate buffers, phosphate buffers, bicarbonate buffers, triethanolamine, and combinations thereof.

Preferably, the antifreeze has an electrical shock risk similar to that of water when discharged onto energized equipment found in dwelling units, and has a freezing point below −10° F., and more preferably about −15° F. or lower. Preferably, the antifreeze has a pH of about 6 to about 8, and preferably about neutral to below S. Additionally, it is preferable that the conductivity of the antifreeze is no more than 1200 μS/cr$^2$ at room temperature, although higher conductivities can be permitted, up to about 2500 μS/cm$^2$ at room temperature.

Sprinklers and sprinkler systems (including wet systems) comprising antifreezes and methods of preventing wet sprinklers and sprinkler systems from freezing using antifreezes also are provided. Wet sprinklers, sprinkler systems, methods of controlling, suppressing and/or extinguishing a fire that occur in a cold environment, and methods of preventing sprinklers and sprinkler systems from freezing also are provided.

The systems contain antifreezes, wherein the antifreezes comprise water; glycerol; and a salt of an organic acid having one of more carboxylic acid groups, wherein glycerol is present in a volume percentage of less than 80% and the salt is present in a weight percentage of less than 2%, preferably less than 1.75%, more preferably less than 1.5%, still more preferably less than 1.25%, and still more preferably less than 1%, wherein the wet sprinkler systems can limit temperatures in a ceiling space under 600° F. (316° C.) during a fire (for example, measured 2 to 3 inches below the ceiling space). The antifreezes can comprise one or more buffers, such as citrate buffers, carbonate buffers, phosphate buffers, bicarbonate buffers, triethanolamine, and combinations thereof. Preferred salts for the antifreeze include potassium acetate, potassium formate and potassium succinate. Preferably, the antifreezes have an electrical shock risk similar to that of water when discharged onto energized equipment found in dwelling units, and preferably have a freezing point below −10° F., and more preferably about −15° F. or lower.

The wet sprinkler systems should have at least the portion of the wet sprinkler system that is exposed to the cold environment filled with antifreeze. The wet sprinkler systems also can have various portions to all portions of the wet sprinkler system filled with antifreeze.

Preferred embodiments of the wet sprinkler systems during a fire can limit the temperature to no more than 200° F. (93° C.) at 5¼ feet (1.6 m) above the floor space. Preferred embodiments during a fire can limit the temperature to no more than 130° F. (93° C.) at 5¼ feet (1.6 m) above the floor space over a continuous 2-minute period. Preferred embodiments during a fire can limit the temperature of the ceiling material ¼ inch (6.4 mm) behind the surface of the ceiling is no more than 500° F. (260° C.).

Preferred embodiments also include methods of providing for the control, suppression and/or extinguishment of a fire that occurs in a cold environment, such as freezers, cold rooms and locations exposed to the elements. The systems used in the methods contain antifreezes, wherein the antifreezes comprise water; glycerol; and salts of organic acids having one of more carboxylic acid groups, wherein glycerol is present in a volume percentage of less than 48% and the salt is present in a weight percentage of less than 2%. The method can limit temperatures in a ceiling space under 600° F. (316° C.) during a fire (for example, measured 3 inches below the ceiling space). The antifreezes, as described above, can comprise one or more buffers, such as citrate buffers, carbonate buffers, phosphate buffers, bicarbonate buffers, triethanolamine, and combinations thereof. Preferred salts for the antifreeze include potassium acetate, potassium formate and potassium succinate. Preferably, the antifreezes have an electrical shock risk similar to that of water when discharged onto energized equipment found in dwelling units, and preferably have a freezing point below −10° F., and more preferably about −15° F. or lower.

The wet sprinkler systems used according to the methods can have the portion of the wet sprinkler system that is exposed to the cold environment is filled with antifreeze. The wet sprinkler systems also can have the entirety of the wet sprinkler system filled with antifreeze.

Preferred embodiments of the wet sprinkler systems used according to the methods during a fire can limit the temperature to no more than 200° F. (93° C.) at 5¼ feet (1.6 m) above the floor space. Preferred embodiments during a fire can limit the temperature to no more than 130° F. (93° C.) at 5¼ feet (1.6 m) above the floor space over a continuous 2-minute period. Preferred embodiments during a fire can limit the temperature of the ceiling material ¼ inch (6.4 mm) behind the surface of the ceiling is no more than 500° F. (260° C.).

There are also provided wet sprinkler systems for use in a cold environment, wherein the systems contain antifreeze, wherein the antifreeze comprises water; glycerol; and a salt of an organic acid having one of more carboxylic acid groups, wherein glycerol is present in a volume percentage of less than 48% and the salt is present in a weight percentage of less than 2%, preferably less than 1.75%, more preferably less than 1.5%, still more preferably less than 1.25%, and still more preferably less than 1%, wherein the wet sprinkler system can limit temperatures in a ceiling space to no more than 1400° F. (760° C.) during a fire. The wet sprinkler system can limit temperatures to no more than 1400° F. (760° C.) at 15 feet 7 inches (4.80 m) above the floor space. Preferably, wet sprinkler system can limit temperatures to no more than 1200° F. (649° (C') at 15 feet 7 inches (4.80 m) above the floor space over a continuous 10-minute period.

Moreover, there are provided methods of controlling a fire that occurs in a cold environment, wherein the methods comprise the steps of: providing a wet sprinkler system that is at least partially located in cold environment; and deploying in the wet sprinkler system antifreezes, wherein the antifreeze comprise water; glycerol; and a salt of an organic acid having one of more carboxylic acid groups, wherein glycerol is present in a volume percentage of less than 48% and the salt is present in a weight percentage of less than 2%, preferably less than 1.75%, more preferably less than 1.5%, still more preferably less than 1.25%, and still more preferably less than 1%, wherein the wet sprinkler system can limit temperatures in a ceiling space to no more than 1400° F. (760° C.) during a fire. The method can limit temperatures to no more than 1400° F. (760° C.) at 15 feet 7 inches (4.80 m) above the floor space. Preferably, the method can limit temperatures to no more than 1200° F. (649° C.) at 15 feet 7 inches (4.80 m) above the floor space over a continuous 10-minute period.

The inventions further provide wet sprinkler systems for use in a cold environment, wherein the systems contain an antifreeze, wherein the antifreeze comprises water; glycerol; and a salt of an organic acid having one of more carboxylic acid groups, wherein glycerol is present in a volume percentage of less than 48% and the salt is present in a weight percentage of less than 2%, preferably less than 1.75%, more preferably less than 1.5%, still more preferably less than 1.25%, and still more preferably less than 1%, wherein the wet sprinkler system can suppress a fire involving a Standard Class II commodity. The systems can suppress a fire in a building with a ceiling no higher than 45.25 feet (13.79 m).

Also provided are methods of suppressing a fire occurring in a cold environment and involving a Standard Class II commodity, wherein the method comprises the steps of: providing a wet sprinkler system that is at least partially located in cold environment; and deploying in the wet sprinkler system an antifreeze, wherein the antifreeze comprises water; glycerol; and a salt of an organic acid having one of more carboxylic acid groups, wherein glycerol is present in a volume percentage of less than 48% and the salt is present in a weight percentage of less than 2%, preferably less than 1.75%, more preferably less than 1.5%, still more preferably less than 1.25%, and still more preferably less than 1%, wherein the wet sprinkler system can suppress a fire involving a Standard Class 11 commodity. The methods can suppress a fire in a building with a ceiling no higher than 45.25 feet (13.79 m).

BRIEF DESCRIPTION OF DRAWINGS

The accompanying drawings, which are incorporated herein and constitute part of this specification, illustrate exemplary approaches and protocols for testing embodiments of the invention, and together, with the general description given above and the detailed description given below, serve to explain the features, characteristics and capabilities of aspects of the invention. It should be understood that the preferred embodiments are teachings and examples of the invention as provided by the appended claims.

DETAILED DESCRIPTION

Antifreeze formulations, in general, take advantage of the phenomena that impurities lower the freezing point and increases the boiling point of a pure substance. When formulating antifreeze, it is therefore advantageous to add components that are soluble in water and can form a homogeneous solution. Components that are water soluble are ones that are polar, ionic and/or contain hydroxyl moieties (—OH groups). Ionic compounds (i.e., compounds having electrical charges that are either a positive, negative, or both) are more water soluble than their uncharged compounds. Moreover, ionic compounds add to the entropy of a solution, which contributes to freezing point depression.

All numerical limits and ranges set forth herein include all numbers or values thereabout or therebetween of the numbers of the range or limit. The ranges and limits disclosed herein expressly denominate and set forth all integers, decimals and fractional values defined by the range or limit. As shown by the following examples: (i), a "range of 1 to 10," for instance, includes and discloses all values, for example 1, 2, 3, 3.5, 3.8, 4, 4.12, 5.981, 6.2, 7, etc. Ranges also can include negative values, if recited. A numerical limit of "up to 10," for instance, includes and discloses all values, for example 0, 0.5, 1, 2, 3, 3.5, 3.8, 4, 4.12, 5.981, 6.2, 7, etc., and can include negative values depending on context, as is apparent to one skilled in the art (e.g., temperatures). In a similar manner, a numerical limit of "at least 10" or "10 or above" includes 10 and all values above 10, as the skilled person would know.

According to the invention, the water used to make the antifreeze should preferably be soft. A preferred conductivity range at room temperature (68° F. to 79° F.) for the soft water is about 0 to about 500 µS/cm$^2$, preferably 25 to 400 µS/cm$^2$, more preferably 30 to 350 µS/cm$^2$, still more preferably 200 to 350 µS/cm$^2$, and even more preferably 320 to 340 µS/cm$^2$. Values thereabout or there between these integers are included and can be employed according to the invention Harder water can be softened by ion removal approaches, including distillation and reverse osmosis, to the point of becoming effectively deionized. Deionized water can be used according to the inventions. Deionized water typically has conductivity ranging from 10 to 50 µS/cm$^2$ (typically about 30 S/cm$^2$). USP-grade water (U.S. Pharmacopeia) also is commercially-available and usable according to the inventions.

Water that is above 500 µS/cm² but below 600 µS/cm², below 700 µS/cm², below 800 µS/cm², below 900 µS/cm², below 1000 µS/cm², below 1100 µS/cm², below 1200 µS/cm², below 1500 µS/cm² or below 2000 µS/cm² is less soft but can be permitted depending on the guideline or standard.

The term "about" (~) in the context of numerical values and ranges refers to values or ranges that approximate or are close to the recited values or ranges such that the invention can perform as intended, such as having a desired rate, amount, degree or extent of components, conductivity, freeze protection, etc., as is apparent from the teachings contained herein. Thus, these terms encompass values beyond those simply resulting from random and systematic error.

According to the invention, glycerol and other constituents are added to water to depress the freezing point, such as carboxylates. These other constituents include salts of organic acids having one or more carboxylic acid groups (—COOH). These acids tend to be classified as weak acids, and examples include formic acid (methanoic acid), acetic acid (ethanoic acid), propionic acid, butyric acid (butanoic acid), valeric acid (pentanoic acid), caproic acid (hexanoic acid), lactic acid (2-hydroxypropanoic acid), malic acid (2-hydroxybutanedioic acid), citric acid (2-hydroxypropane-1,2,3-tricarboxylic acid), benzoic acid (benzenecarboxylic acid), oxalic acid (ethanedioic acid), malonic acid (propanedioic acid), succinic acid (butanedioic acid), glutaric acid (pentanedioic acid), adipic acid (hexanedioic acid), pimelic acid (heptanedioic acid), suberic acid (octanedioic acid), azelaic acid (nonanedioic acid), sebacic acid (decanedioic acid). The cation of the salt can be an alkali metal, such as potassium ($K^+$) or sodium ($Na^+$). Other cations can be employed, however.

Glycerol should be present in a volume percentage ranging from 35 to 48%. Preferably, ethylene and propylene glycols are avoided according to the invention.

According to the invention, the antifreeze should have high ambient temperature stability, avoid the flashover problem of previous antifreezes and result in low increases in heat release rates (HRR). The antifreeze should have hydraulic flow characteristics that allows transit through pipes and sprinkler assemblies, and preferably have hydraulic flow characteristics that are sufficiently similar to that of water to permit functionality. Additionally, corrosiveness and conductivity should be limited, and a stable pH, preferably near neutral should be maintained. The pH should be slightly acidic (about 6) to slightly basic (about 8). Preferred formulations have a pH ranging from 7 to 8, and more preferably 7 to below 8.

UL (Underwriters Laboratories) establishes and publishes criteria for antifreezes for deployment (use) in sprinklers. UL 2901 covers requirements for antifreezes used in fire sprinkler systems, which is hereby incorporated by reference in its entirety. Currently, no antifreezes are commercially available that meet UL 2901. The antifreezes according to the invention are contemplated to meet at least most requirements of UL 2901, as well as possible changes in the future.

UL 2901 specifies the characteristics of acceptable antifteezes and sets forth testing procedures and parameters. Characteristics of an antifreeze meeting UL 2901 include:

High Ambient Temperature Stability based on Pour Point, Viscosity, Specific Gravity, pH and Freeze Point after being exposed to an elevated temperature for a period of time (158° F. for 90 days is specified).

Temperature Cycling Stability based on Pour Point, Viscosity, Specific Gravity, pH and Freeze Point after cycling at intended use temperature extremes for 40 cycles.

Electrical conductivity not to exceed 1000 µSiemens/cm² at room temperature or exhibit an electrical shock risk similar to water when discharged onto representative energized equipment typically found in dwelling units. There is an emerging view that the 1000 µSiemens/cm² level is too low, and therefore the upper conductivity limit could be as high as about 2500 µSiemens/cm², although upper limits of 1500 µSiemens/cm², 1400 µSiemens/cm², 1300 µSiemens/cm², or 1200 µSiemens/cm² appear more likely to be accepted by the field. Formulations with such conductivity levels can be used according to the invention.

Corrosion rate of at minimum and maximum concentrations not to exceed 1.0 mils/year on steel, brass, stainless steel and any other metal the sprinkler and other components such as pipes, couplings and valves are composed.

Pit depth corrosion rate of at minimum and maximum concentrations not to exceed 1.0 mils/year on steel, brass, stainless steel and any other metal the sprinkler and other components such as pipes, couplings and valves are composed.

Exposure to elastomeric materials to assess changes tensile strength and elongation, volume and weight of the materials (Natural Rubber, EPDM, BUNA-N, styrene butadiene rubber and any other elastomer in the sprinkler.

Stress corrosion at minimum rand maximum concentrations on steel, brass, stainless steel and any other metal the sprinkler and other components such as pipes, couplings and valves are composed.

Galvanic action at minimum and maximum concentrations on steel, brass, stainless steel and any other metal the sprinkler and other components such as pipes, couplings and valves are composed.

Compatibility with polymers (CPVC and cross-linked polyethylene).

Acceptable toxicity.

Heat release rate of no more than 10% above the heat release rate measured prior to the discharge of the antifreeze.

Firefighting effectiveness based upon nominal discharge coefficient and nominal pressure.

As discussed above, salts of organic acids having one or more carboxylic acid groups (—COOH) are added. These salts lower the freezing point of the solution more than 5° F. than without the salts, and decrease the heat release rate when sprayed on fire. The reduction in freezing point is a colligative property of the solution, i.e., independent of chemical properties. For example, potassium acetate contributes two ions per molecule, which adds to the total entropy of the solution lowering the freezing point. While the addition of most hydrocarbons to a solution will add heat to a fire, potassium acetate and compounds having similar molecular structures reduce the heat of a fire by liberating carbon dioxide. Preferred percent range for salts of organic acids having one or more carboxylic acid groups are 0.01% to 2% wt., preferably 0.1% wt. to 0.5% wt. Betaine, such as trimethylglycine, are zwitterions and can be used in the same range of weight percentages.

Preferred salts include, but are not limited to:

(Potassium Acetate)     (Potassium Formate)

(Potassium Succinate)

To assist with pH stability, buffers also can be added to the antifreeze. Buffers for use according to the invention include citrate buffers, carbonate buffers, phosphate buffers, bicarbonate buffers, and triethanolamine. Some buffers also provide the beneficial effect of evolving carbon dioxide during combustion. Preferred percent range of buffers are 0.01% to 2% wt., preferably 0.1% wt. to 0.5% wt.

When the antifreeze is deployed in a wet sprinkler system, at least the portion of the wet sprinkler system that is exposed to freezing temperatures should be filled with the antifreeze. The entirety (or portions thereof, including substantial portions) of the wet sprinkler system can be filled with the antifreeze.

The invention is further described by the following examples, which are illustrative of the many aspects of the invention, but do not limit the invention in any manner. Water for the below formulas was sourced from Marinette County, Wisconsin. The water is soft, and has a conductivity of about 320 to 340 µS/cm² at room temperature (68° F. to 79° F.).

Antifreezes according to the present invention can meet the following characteristics:
(A) Conductivity at room temperature of about 2500 µS/cm² or lower, preferably less than 2200 µS/cm², preferably less than 2000 µS/cm², preferably less than 1500 µS/cm², still preferably less than 1400 µS/cm², still preferably less than 1300 µS/cm², still preferably less than 1200 µS/cm², still preferably less than 1150 µS/cm², more preferably less than 1100 µS/cm², more preferably less than 1075 µS/cm² and still more preferably less than 1050 µS/cm² and/or exhibit an electrical shock risk similar to water when discharged onto representative energized equipment typically found in dwelling units.
(B) A heat release rate of no more than 25% above the heat release rate measured prior to the discharge of the antifreeze, preferably a heat release rate of no more than 20% above the heat release rate measured prior to the discharge of the antifreeze, still more preferably no more than 15% above the heat release rate measured prior to the discharge of the antifreeze, still more preferably a heat release rate of no more than 12% above the heat release rate measured prior to the discharge of the antifreeze and even still more preferably no more than 10% above the heat release rate measured prior to the discharge of the antifreeze. Current and emerging approaches to evaluating heat release rates are discussed in greater detail below.
(C) A stable pH ranging from about 6 to about 8, and preferably neutral to below 8.
(D) A freezing point lower than −10° F., preferably lower than −15° F., preferably lower than −20° F., more preferably lower than −25° F., still more preferably lower than about −30° F., yet more preferably −35° F., and even lower.
(E) Viscosity—The viscosity should be such that the antifreeze can flow through the pipes and sprinklers. Preferably between 0.8 to 120 cP (centipoise), more preferably between 0.85 and 110 cP, and still more preferably between 0.89 and 100 cP.

The invention is further described by the following examples, which are illustrative of the many aspects of the invention, but do not limit the invention in any manner.

EXAMPLES

Example 1. The Formula of Example 1 (Formula 1) is as Follows

| Material | Amount |
| --- | --- |
| soft water | 56% vol./50.22% wt |
| Glycerol | 44% vol./49.35% wt. |
| potassium acetate | 0.37% wt. |
| triethanolamine | 0.09% wt. |
| trisodium citrate | 0.07% wt. |
| monosodium phosphate | 0.07% wt. |

Formula 1 has a conductivity of 1008 µSiemens/cm) at 78° F., a pH of 7.9 and a freezing point of −30° F. in the absence of deliberate seeding. A repeated testing yielded a conductivity of 986 µSiemens/cm² at 78° F., a pH of 7.9 and a freezing point of −36° F. in the absence of deliberate seeding.

Example 2. The Formula of Example 2 (Formula 2) is as Follows

| Material | Amount |
| --- | --- |
| soft water | 63% vol./~57.2% wt |
| Glycerol | 37% vol./~42.4% wt. |
| Potassium formate | ~0.2% wt. |
| Potassium succinate | ~0.1% wt. |
| Betaine | ~0.3% wt. |

Formula 2 has a conductivity of 961 µSiemens/cm² at 78° F., a pH of 7.0 and a freezing point of −17° F. in the absence of deliberate seeding.

Example 3. The Formula of Example 3 (Formula 3) is as Follows

| Material | Amount |
| --- | --- |
| soft water | 63% vol./~57.1% wt |
| Glycerol | 37% vol./~42.3% wt. |
| potassium acetate | ~0.3% wt. |
| Potassium succinate | ~0.1% wt. |
| Betaine | ~0.3% wt. |
| Bicarbonate | ~0.1% wt. |

Formula 3 has a conductivity of 1107 µSiemens/cm² at 78° F., a pH of 6.5 and a freezing point of −18° F. in the absence of deliberate seeding.

Example 4. The Formula of Example 4 (Formula 4) is as Follows

| Material | Amount |
| --- | --- |
| soft water | 56% vol./~55.3% wt |
| Glycerol | 44% vol./~44.2% wt. |
| Potassium acetate | ~0.3% wt. |

Formula 4 has a conductivity of 1100 μSiemens/cm$^2$ at 78° F., a pH of 7.4 and a freezing point of −21° F. in the absence of deliberate seeding. Repeated tests of the formula provided respective conductivities of 1060 μSiemens/cm$^2$ and 1057 μSiemens/cm$^2$ at 78° F., pH readings of 7.5 and 7.6 and freezing points of −21° F. and −24° F. in the absence of deliberate seeding.

Example 5. The Formula of Example 5 (Formula 5) is as Follows

| Material | Amount |
| --- | --- |
| soft water | 59% vol./~57.3% wt |
| Glycerol | 41% vol./~42.5% wt. |
| Potassium acetate | ~0.3% wt. |

Formula 5 has a conductivity of 987 μSiemens/cm$^2$ at 78° F., a pH of 7.6 and a freezing point of −24.5° F. in the absence of deliberate seeding.

Example 6. The Formula of Example 6 (Formula 6) is as Follows

| Material | Amount |
| --- | --- |
| soft water | 56% vol./~55.3% wt |
| Glycerol | 44% vol./~44.3% wt. |
| Potassium acetate | ~0.4% wt. |

Formula 6 has a conductivity of 1030 μSiemens/cm$^2$ at 78° F., a pH of 7.6 and a freezing point of −21° F. in the absence of deliberate seeding. A repeated tested yielded a conductivity of 1005 μSiemens/cm$^2$ at 78° F., a pH of 7.4 and a freezing point of −21° F. in the absence of deliberate seeding.

Example 7. The Formula of Example 7 (Formula 7) is as Follows

| Material | Amount |
| --- | --- |
| soft water | 57% vol./~56.8% wt |
| Glycerol | 43% vol./~42.8% wt. |
| Potassium acetate | ~0.4% wt. |

Formula 7 has a conductivity of 1060 μSiemens/cm$^2$ at 78° F., a pH of 7.5 and a freezing point of −20° F. in the absence of deliberate seeding.

Example 8. The Formula of Example 8 (Formula 8) is as Follows

| Material | Amount |
| --- | --- |
| soft water | 56% vol./~55.4% wt |
| Glycerol | 44% vol./~44.3% wt. |
| Potassium acetate | ~0.17% wt. |
| Potassium formate | ~0.17% wt. |

Formula 8 has a conductivity of 1010 μSiemens/cm$^2$ at 78° F., a pH of 7.8 and a freezing point of −20° F. in the absence of deliberate seeding.

Example 9. The Formula of Example 9 (Formula 9) is as Follows

| Material | Amount |
| --- | --- |
| soft water | 57% vol./~56.8% wt |
| Glycerol | 43% vol./~42.8% wt. |
| Potassium acetate | ~0.37% wt. |

Formula 9 has a conductivity of 975 μSiemens/cm$^2$ at 78° F., a pH of 7.5 and a freezing point of −16° F. in the absence of deliberate seeding.

Example 10. The Formula of Example 10 (Formula 10) is as Follows

| Material | Amount |
| --- | --- |
| soft water | 56% vol./~55.4% wt |
| Glycerol | 44% vol./~44.3% wt. |
| Potassium acetate | ~0.37% wt. |

Formula 10 has a conductivity of 920 μSiemens/cm$^2$ at 78° F., a pH of 7.6 and a freezing point of −20.5° F. in the absence of deliberate seeding.

Example 11. The Formula of Example 11 (Formula 11) is as Follows

| Material | Amount |
| --- | --- |
| soft water | 57% vol./~56.9% wt |
| Glycerol | 44% vol./~42.7% wt. |
| Potassium acetate | ~0.43% wt. |

Formula 11 has a conductivity of 1058 μSiemens/cm$^2$ at 78° F., a pH of 8.0 and a freezing point of −23° F. in the absence of deliberate seeding.

Example 12. The Formula of Example 12 (Formula 12) is as Follows

| Material | Amount |
| --- | --- |
| soft water | 59% vol./~58.4% wt |
| Glycerol | 41% vol./~41.2% wt. |
| Potassium acetate | ~0.55% wt. |

Formula 12 has a conductivity of 1010 μSiemens/cm² at 78° F., a pH of 7.9 and a freezing point of −16.5° F. in the absence of deliberate seeding.

Example 13—Testing according to 1 L 2901 and UL 1626. Testing of antifreeze is to be conducted according to UL 2901, which refers to and is based on UL 1626 and other standards. UL 2901 and UL 1626, and standards referenced therein, and hereby incorporated by reference.

A sprinkler discharging the most concentrated antifreeze solution shall not cause the total heat release rate from a heptane spray fire to increase by more than 10 percent above the heat release rate measured just prior to the discharge of the antifreeze solution, for any consecutive 15 second period throughout the antifreeze solution discharge.

Tests are to be conducted using open standard spray pendent sprinklers having a nominal K-factor of 4.2 and 8.0 gpm/(psig)$^{1/2}$ The sprinklers are to be installed onto a supply piping arrangement consisting of nominal 2-inch diameter steel pipe or larger connected to a pump system capable of providing the required test pressure and flow. An electronic pressure transducer is to be installed in the supply piping at a distance not greater than 10 feet upstream from the sprinklers. The pump is to be connected to a supply of antifreeze solution that is of sufficient quantity to support the duration of the test.

Figure 1:
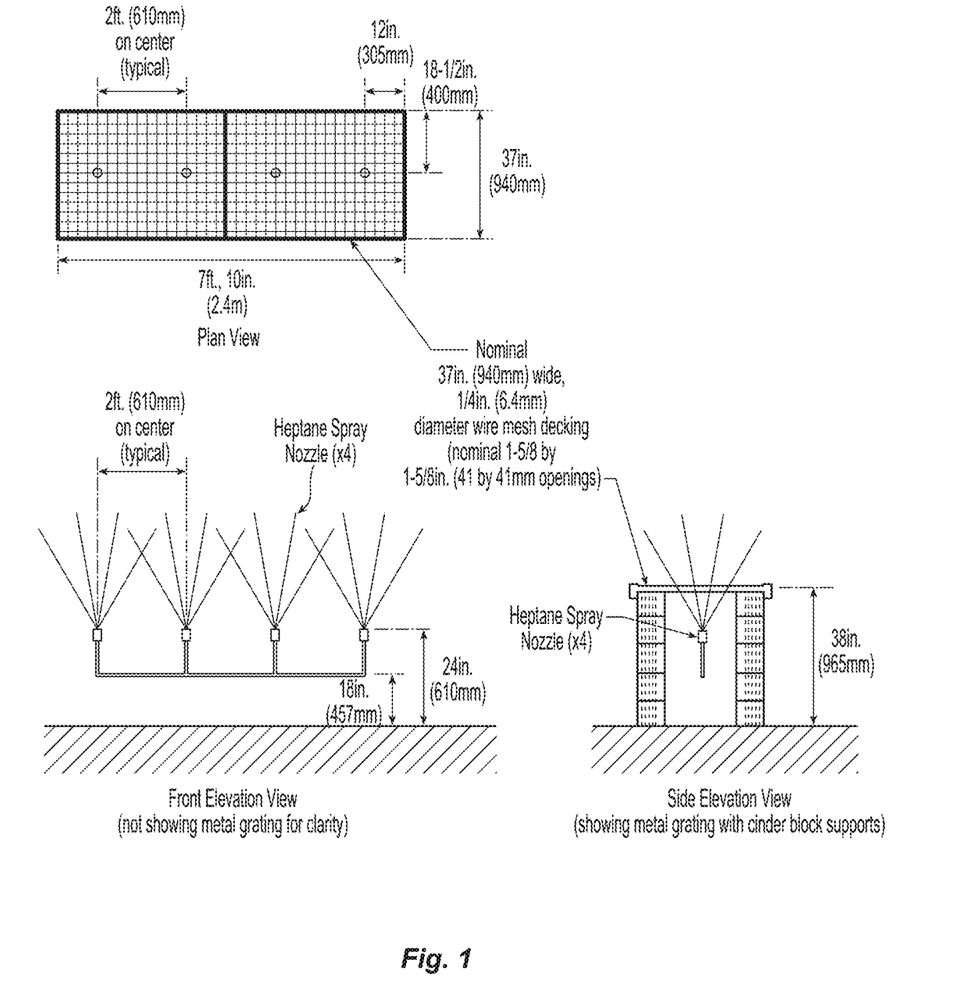
FIG. 1 depicts a heptane spray burner assembly illustrated in UL 2901.

The fire source is a line-burner assembly with four spray nozzles arranged to discharge heptane at a total flow rate of 16 gpm (6.0 l/min) resulting in a fire having a nominal total heat release rate of 1,400 to 3,000 kW. The spray nozzles are to be spaced 24 inches (610 mm) apart on the supply line and 24 inches (610 mm) above the floor. Metal grating having nominal dimensions of 94 inches long by 37 inches (940 mm) wide with a nominal 0.2.5 inch (6.4 mm) diameter wire mesh shall be installed above the heptane spray nozzles at a height of 38 inches (965 mm) above the floor. FIG. 1 provides details of the burner assembly.

Total heat release rate measurement (HRR). The total heat release rate is to be measured using a paramagnetic oxygen analyzer, velocity probe, and a Type K thermocouple or equivalent under a calorimeter having diameter of not less than 25 feet (7.6 m). The instrumentation is to be located in the exhaust duct of the heat release rate calorimeter at a location that minimizes the influence of bends or exhaust devices. The heat release rate measurement system is to be calibrated using an atomized heptane diffusion burner. The calibration is to be performed using flows of 1, 2, 3 and 4 gpm (3.8, 7.6, 11.4 and 15.2 l/min) of heptane. A burner constructed with Model F −80–30, 70 degree PLP nozzles manufactured by Monarch Nozzle Co. has been found to be acceptable. The heat release rate is to be calculated at each of the flows as follows:

$$HRR_t = 16.54 \times 10^3 V_e \frac{298}{T_e} A \frac{0.2095 - X_{O2}}{1.076 - 1.36 X_{O2}}$$

Figure 2:
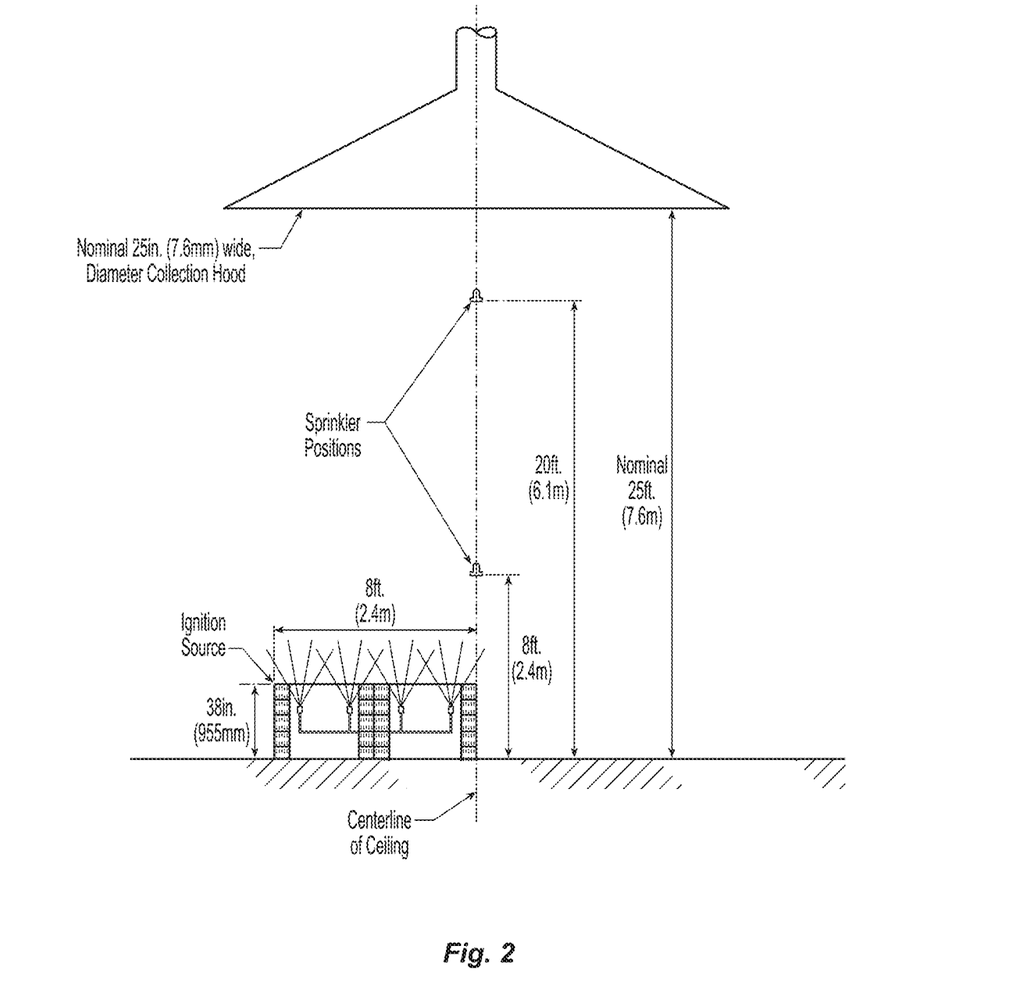
FIG. 2 depicts a fire test arrangement illustrated in UL 2901.

Four tests are to be conducted in accordance with the below table, and FIG. 2 provides details of the test arrangement.

| Test | Nominal Sprinkler K-factor gpm/(psig)$^{1/2}$ | Sprinkler Elevation Above the Floor | | Sprinkler Inlet Test Pressure Range | |
|---|---|---|---|---|---|
| | | feet | (m) | psig | (kPa) |
| 1 | 4.2 | 8 | (2.4) | 10-150 | (69-1034) |
| 2 | 4.2 | 20 | (6.1) | 10-150 | (69-1034) |
| 3 | 8.0 | 8 | (2.4) | 10-100 | (69-690) |
| 4 | 8.0 | 20 | (6.1) | 10-100 | (69-690) |

After the data collection system is operating, the spray from the four-nozzle spray burner is to be ignited and then allowed to burn freely for 120 seconds while flowing a total of 1.6 gpm (6.0 l/min) of heptane through the line burner assembly. After the 120 second free-burn period, the antifreeze solution is to be discharged through the open sprinklers starting at flowing pressure of 10 psig (69 kPa) and then gradually increasing the pressure to the maximum pressure specified in the above table. At nominal pressure increments of 10 psig (69 kPa), the pressure is to be maintained at each test pressure for a nominal dwell time of 10 seconds before increasing the pressure to the next incremental pressure value. Total heat release rate measurements shall be recorded continuously throughout the duration of the test.

The emerging approach to evaluating heat release rates better takes into consideration the intrinsic variability of heptane burners. The approach modifies UL 2901 to the following: a sprinkler discharging the most concentrated antifreeze solution shall not cause the total heat release rate from a heptane spray fire to increase by more than 10 percent above the maximum running 60 second average heat release rate measured prior to the discharge of the antifreeze solution, for any consecutive 15 second period throughout the antifreeze solution discharge. Based on a one second scan interval, the running 60 second average heat release rate for the test shall be calculated as follows:

$$HRR_{60\,avg} = \frac{1}{60} \sum_{i=n}^{i=n+59} HRR_i$$

In which:
$HRR_{60\,avg}$ is the 60 second average of the Total Heat Release Rate
n is the test time scan number (n=1, 2, 3 . . . etc.) measured in seconds.
n should be between:
n=0 seconds; defined as time zero which is the ignition of the burner assembly and
n=61 seconds (test time of 120 seconds); time at which the antifreeze solution is first discharged.

The maximum running 60 second average heat release rate is the maximum value of $HRR_{60\,avg}$ during the time period described above.

Fire Fighting Effectiveness

When discharging the most concentrated solution of antifreeze, representative residential sprinklers shall demonstrate compliance with the fire test requirements described in the Fire Test Section of the Standard for Residential Sprinklers for Fire Protection Service, UL 1626 (which is incorporated by reference), when tested as follows:

The test room for these tests is to be configured based upon a rated sprinkler coverage area of 16 feet by 16 feet (4.9 m by 4.9 m). Recessed pendent and horizontal sidewall residential sprinklers that have previously demonstrated compliance with the fire tests specified in UL 1626 using water, are to be utilized for these tests. The following tests are to be conducted in accordance with the Fire Test Section of UL 1626 except that the most concentrated solution of antifreeze is to be discharged from the sprinkler in lieu of water:

(a) Recessed pendent sprinkler having a nominal discharge coefficient of 4.9 tested with nominal pressure of 7 psig (48 kPa) at the sprinkler inlet with the frame arms orientated perpendicular to the short wall;

(a1) an alternative approach for (a) is emerging where the recessed pendent sprinkler having a nominal discharge coefficient of 4.9 and 175° F. (79° C.) temperature rating tested with the frame arms orientated perpendicular to the short wall. First head operation will be at a nominal pressure of 13.5 psig (93 kPa) and pressure with two heads operating will be at a nominal pressure of 7 psi (48 kPa);

(b) Recessed pendent sprinkler having a nominal discharge coefficient of 4.9 tested with nominal pressure of 100 psig (690 kPa) at the sprinkler inlet with the frame arms orientated parallel to the short wall;

(c) Recessed horizontal sidewall sprinkler having a nominal discharge coefficient of 4.2 tested with nominal pressure of 23 psig (159 kPa) at the sprinkler inlet with the test fire located on the far wall (opposite of the wall in which the sprinklers are installed);

(c1) an alternative approach for (c) is emerging where the recessed horizontal sidewall sprinkler having a nominal discharge coefficient of 4.2 and 175° F. (79° C.) temperature rating is tested with the test fire located on the far wall (opposite of the wall in which the sprinklers are installed). First head operation will be at a nominal pressure of 30 psig (207 kPa) and pressure with two heads operating will be at a nominal pressure of 23 psi (159 kPa); and (d) Recessed horizontal sidewall sprinkler having a nominal discharge coefficient of 4.2 tested with nominal pressure of 100 psig (690 KPa) at the sprinkler inlet with the test fire located on the far wall (opposite of the wall in which the sprinklers are installed).

The flowing pressures indicated above are to be based upon using an adjusted discharge coefficient (K-factor) for the sprinkler calculated as follows:

$$K_A = 7.94 K_W \sqrt{\frac{1}{\gamma_A}}$$

$K_A$=Sprinkler K—factor discharging the antifreeze solution
$K_W$=Sprinkler K—factor discharging water
$\gamma_A$=Density of the antifreeze solution at the temperature used for testing, lbs./ft$^3$ The Fire Test, according to UL 1626, limits temperatures over defined periods of time at various locations of a fire test arrangement in a test room made of building materials and containing furnishings and/or other items. The test room is representative of enclosures, and comprises walls, floor(s), ceiling(s), and attendant spaces that are proximal to the wall, floor and ceiling, as apparent to the person skilled in the art, typically 12 inches or closer unless otherwise defined.

UL 1626 requires that a residential sprinkler shall limit temperatures when tested at each rated-spacing referenced in the installation instructions. Additionally, a maximum of two residential sprinklers shall operate. The sprinklers shall limit temperatures as follows:

(a) The maximum temperature 3 inches (76 mm) below the ceiling at representative locations shall not exceed 600° F. (316° C.).

(b) The maximum temperature 5¼ feet (1.6 in) above the floor shall not exceed 200° F. (93° C.).

(c) The temperature at the location described in (b) shall not exceed 130° F. (54° C.) for more than any continuous 2-minute period.

(d) The maximum ceiling material temperature ¼ inch (6.4 mm) behind the finished ceiling surface shall not exceed 500° F. (260° C.).

Viscosity at Temperature Limitations

The viscosity of each concentration of antifreeze solution shall be determined at the temperature limitations specified in the manufacturer's installation instructions and shall correspond to the viscosity specified in the manufacturer's installation instructions.

Viscosity shall be determined as specified in the Standard Test Method for Low-Temperature Viscosity of Lubricants Measured by Brookfield Viscometer, ASTM D2983, using antifreeze samples conditioned at the minimum and maximum use temperature limitations specified in the manufacturer's installation instructions for at least 16 hours.

Resistance to Leakage

Figure 3:
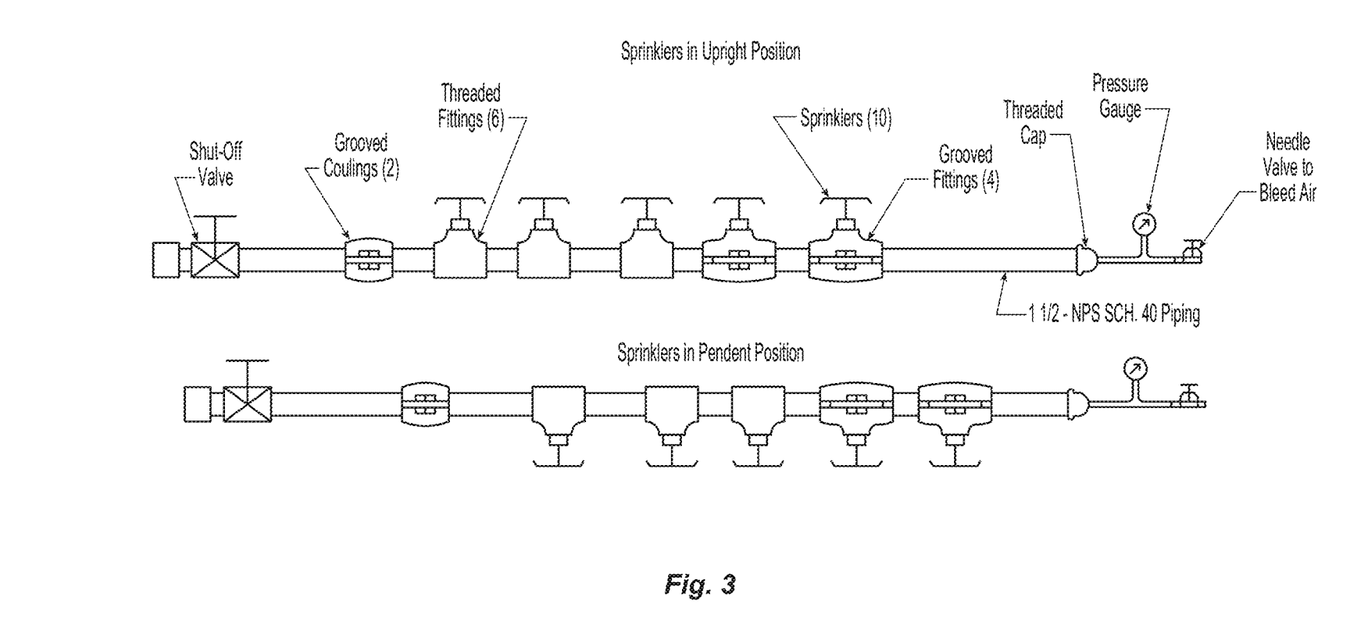
FIG. 3 depicts a leakage test manifold assembly illustrated in UL 2901 with sprinklers in upright and pendent positions.

When tested as described below, antifreeze solution filled and pressurized pipe assemblies with sprinklers attached shall show no signs of leakage for 30 days. Two pipe assemblies that have demonstrated the ability resist leakage when filled and pressurized with water, are to be filled with antifreeze solution and pressurized to 350 psig (2413 kPa). One pipe assembly is to be positioned with six nominal k=5.6 orifice sprinklers in the vertical upright position, and the second pipe assembly is to be positioned with six nominal k=5.6 orifice sprinklers in the vertical pendent position. See FIG. 3 for diagrams of the typical pipe assemblies to be used for testing. The pipe joints are to be prepared by applying three wrap of polytetrafluoroethylene (PTFE) pipe joint sealant tape to each male thread for the pipe and sprinklers prior to assembly. The sprinklers are to be assembled with a torque not exceeding 20 ft.-lb (27 N-M). The samples are to be examined at least weekly and at the end of the 30 day test period for evidence of leakage of solution at the pipe joints and sprinkler closure caps.

Example 14. Testing Results. Formulas were tested by pump method where the sprayer was pumped every, 3 seconds to maintain relatively constant pressure. Some formulas were tested more than once.

| Formula | Baseline HRR in kW (no antifreeze applied) | 110% level over baseline HRR | Percentage of test HRR over 110% baseline | Average number of values above 110% baseline in continuous 15 second periods |
|---|---|---|---|---|
| 1 | 4.8 | 5.28 | 53.8% | 7.4 |
| 2 | 5.17 | 5.69 | 51.3% | 9 |
| 3 | 5.04 | 5.55 | 43.6% | 8 |
| 4 | 4.74 | 5.22 | 33.3% | 5 |
|  | 4.84 | 5.33 | 38.4% | 6 |
| 5 | 4.97 | 5.47 | 59.0% | 10 |
| 6 | 4.95 | 5.45 | 56.4% | 9 |
|  | 5.18 | 5.71 | 28.2% | 4 |
| 7 | 4.80 | 5.28 | 48.7% | 8 |
| 8 | 4.7 | 5.17 | 76.9% | 11 |
| 9 | 4.76 | 5.24 | 61.5% | 8 |
| 10 | 5.09 | 5.60 | 53.8% | 8 |
| 11 | 4.72 | 5.2 | 61.5% | 9.16 |
| 12 | 4.57 | 5.03 | 43% | 7.04 |

Formulas 1-12 would meet the UL criteria and/or emerging criteria on HRR. Another formula that utilized 59.1% wt water and 40.6% wt glycerin and 0.3% wt. potassium formate was tested, but would not meet the UL criteria on HRR.

Example 15. Freeze Testing Under ASTM D 1177-05. ASTM D 1177-05 provides a Standard Test Method for Freezing Point of Aqueous Engine Coolants. The standard defines freezing point as "the temperature at which crystallization begins in the absence of supercooling or the maximum temperature reached immediately after initial crystal formation in the case of supercooling." Section 3.1.1. Supercooling is not always encountered if seed crystals form on their own, however. The methodology of ASTM D 1177-05 employs deliberate seeding to ensure the prevention of supercooling. The seeding is accomplished by the introduction to the test solution a wire that has a small amount of frozen test solution on its tip.

The ASTM D 1177-05 testing of Formula 1 resulted in a freezing temperature of −14.6° F.

Example 16. Commercial systems. UL 1626 described in Example 13 specifically pertains the residential systems. However, sprinkler systems are employed in other settings and also are subject to cold temperatures. The testing criteria are analogous, but are designed to take into account different considerations.

UL 199 (which is incorporated by reference) is entitled "Automatic Sprinklers for Fire-Protection Service." UL 199 defines testing for commercial setting. In a commercial setting, the sprinkler system should limit temperatures in a ceiling space to no more than 1400° F. (760° C.) during a fire. Preferably, the sprinkler system limits the temperature to no more than 1400° F. (760° C.) at 15 to 16 feet above the floor space, typically measured at 15'7" (4.80 m) above the floor space. Still more preferably the sprinkler system to no more than 1200° F. (649° C.) at 15 to 16 feet above the floor space, typically measured at 15'7" (4.80 m) above the floor space, over a continuous 10-minute period. Testing approaches and methodologies also are set forth in Fire Protection Research Foundation (FPRF) Antifreeze Research for NFPA 2.

Example 17. Storage systems. A study was conducted on ESFR Sprinklers using antifreeze at UL, which was reviewed by the Fire Protection Research Foundation in their study "Antifreeze Solutions in Home Fire Sprinkler Systems." "FPRF Info for Storage" also is pertinent. These documents disclose the propriety of using antifreeze in storage systems where Standard Class II commodities are stored. These commodities include noncombustible products that is in slatted wooden crates, solid wood boxes, multiple-layered corrugated cartons, or equivalent combustible packaging materials, with or without pallets. Ceiling heights should be between 45 to 46 feet, preferably 45.25 feet (13.79 m).

While the present invention has been disclosed with reference to certain embodiments, numerous modifications, alterations, and changes to the described embodiments are possible without departing from the sphere and scope of the present invention, as described herein. Accordingly, it is intended that the present invention not be limited to the described embodiments, but that it has the full scope defined by the language set forth herein, and equivalents thereof

What is claimed is:

1. An antifreeze comprising:
   water;
   at least about 41 vol. % glycerol; and
   a total of no more than 1.5 wt. % of an organic acid salt that is potassium salt of formic acid (methanoic acid), acetic acid (ethanoic acid), propionic acid, butyric acid (butanoic acid), valeric acid (pentanoic acid), caproic acid (hexanoic acid), lactic acid (2-hydroxypropanoic acid), malic acid (2-hydroxybutanedioic acid), citric acid (2-hydroxypropane-1,2,3-tricarboxylic acid), benzoic acid (benzenecarboxylic acid), oxalic acid (ethanedioic acid), malonic acid (propanedioic acid), succinic acid (butanedioic acid), glutaric acid (pentanedioic acid), adipic acid (hexanedioic acid), pimelic acid (heptanedioic acid), suberic acid (octanedioic acid), azelaic acid (nonanedioic acid), sebacic acid (decanedioic acid), or a mixture of any two or more thereof.

2. The antifreeze of claim 1 further comprising at least one buffer.

3. The antifreeze of claim 2, wherein the buffer is present from about 0.01 to 2 wt. %.

4. The antifreeze of claim 2, wherein the buffer is selected from the group consisting of carbonate buffers, phosphate buffers, bicarbonate buffers, triethanolamine, and combinations of any two or more thereof.

5. The antifreeze of claim 1, wherein the organic acid salt is formic acid (methanoic acid), acetic acid (ethanoic acid), propionic acid, butyric acid (butanoic acid), lactic acid (2-hydroxypropanoic acid), malic acid (2-hydroxybutanedioic acid), citric acid (2-hydroxypropane-1,2,3-tricarboxylic acid), oxalic acid (ethanedioic acid), malonic acid (propanedioic acid), succinic acid (butanedioic acid) or a mixture of any two or more thereof.

6. The antifreeze of claim 1, wherein the antifreeze comprises 0.1 to 1.0 wt. % potassium acetate, potassium formate, potassium succinate, or a combination of two or more thereof.

7. The antifreeze of claim 1 comprising 56 wt % or less of the water.

8. The antifreeze of claim 1 comprising from 35 to 56 wt % of the water.

9. The antifreeze of claim 1, wherein the antifreeze has a pH of about 6 to about 8.

10. The antifreeze of claim 1 which exhibits a freezing point below −10° F. (−23° C.).

11. A wet sprinkler system for use in a cold environment, wherein the system comprises the antifreeze of claim 1.

12. The wet sprinkler system of claim 11, wherein the antifreeze exhibits a heat release rate of no more than 10% higher than a heat release just prior to discharge of the antifreeze solution for any consecutive 15 second period throughout the discharge of the antifreeze; and the heat release rate is determined using pendent sprinklers having a nominal K-factor of 4.2 and 8.0 gpm/(psig)$^{1/2}$ on a supply piping arrangement comprising nominal 2-inch diameter steel pipe or larger connected to a pump system capable of providing the required test pressure and flow.

13. A method of preventing a wet sprinkler system from freezing comprising the step of filling at least a portion of the wet sprinkler system that is exposed to a cold environment with the antifreeze of claim 1.

14. A method of controlling a fire that occurs in a cold environment, wherein the method comprises: providing a wet sprinkler system, comprising the antifreeze of claim 1, that is at least partially located in the cold environment; and deploying in the wet sprinkler system.

* * * * *